United States Patent
Fukuoka et al.

[11] Patent Number: 5,883,879
[45] Date of Patent: Mar. 16, 1999

[54] HIGH DENSITY OPTICAL DISC CONFIGURATION

[75] Inventors: Satoru Fukuoka; Yukihiro Sugawara, both of Yamanashi-ken, Japan

[73] Assignees: Pioneer Video Corporation, Yamanashi-ken; Pioneer Electronic Corporation, Tokyo, both of Japan

[21] Appl. No.: 858,501

[22] Filed: May 19, 1997

[30] Foreign Application Priority Data

May 28, 1996 [JP] Japan .................................. 8-156206

[51] Int. Cl.⁶ ....................................................... G11B 7/24
[52] U.S. Cl. ..................................... 369/275.4; 369/275.3
[58] Field of Search ................................... 369/13, 275.4, 369/275.1, 275.3, 288, 112, 110, 286, 280, 44.26, 124, 109, 58, 275.2

[56] References Cited

U.S. PATENT DOCUMENTS 5,689,495  11/1997  Tsuchiya et al. .................... 369/275.4
5,708,651   1/1998  Sugaya et al. ...................... 369/275.4

*Primary Examiner*—Ali Neyzari
*Attorney, Agent, or Firm*—Nikaido, Marmelstein, Murray & Oram LLP

[57] ABSTRACT

An optical disc includes two transparent substrate layers each having a recording surface with a plurality of pits arranged concentrically or spirally. The plurality of pits represents information stored on the recording surface. Each transparent substrate layer has a thickness of 0.6±0.03 mm. A reflecting layer is formed on each of the recording surfaces of the two transparent substrate layers. An inclining angle formed between a pit inner wall and a normal line of each transparent substrate layer is 20°–55°, and pit depth is set to be $\lambda/3.5N$–$\lambda/2.7N$. $\lambda$ is defined as the wavelength of a laser beam incident the optical disc for reading the information recorded on the optical disc, and N is the index of refraction of each transparent substrate layer.

4 Claims, 3 Drawing Sheets

HIGH DENSITY OPTICAL DISC CONFIGURATION

BACKGROUND OF THE INVENTION

The present invention relates to an optical disc, in particular to an optical disc on which information has been recorded in the form of numerous pits with a high density.

Recently, there has been suggested a DVD (Digital Video Disc) which is capable of recording moving pictures having an information amount of two hours, but which has only a size as large as a CD (Compact Disc).

The suggested DVD is constructed by laminating and bonding together two substrates each having a thickness of 0.6 mm. In such a DVD, the information track pitch has a width of 0.74 μm, a shortest pit has a length of 0.4 μm, a recording surface has an information amount of 4.7 G byte.

In an optical system for reproducing the DVD, there has been used a laser diode producing a laser beam having a wave length of 635 nm or 650 nm, and an objective lens having a NA (Numerical Aperture) of 0.6.

However, with a high density recording medium such as DVD, if the depth of each information pit is set to obtain an optimum modulation degree, there will be a problem that other properties such as jitter (fluctuation) will deviate from an optimum value, hence resulting in a bad reproducibility of a DVD.

SUMMARY OF THE INVENTION

It is an object of the present invention to provide an improved DVD (Digital Video Disc) manufactured not only taking into account its modulation degree but also other properties such as jitter, so as to improve the reproducibility of a DVD, thereby solving the above-mentioned problem peculiar to the above-mentioned prior art.

According to the present invention, there is provided an optical disc comprising: two transparent substrate layers each having a recording surface on which information has been recorded by virtue of numerous pits arranged concentrically or spirally, each transparent substrate layer having a thickness of 0.6±0.03 mm; two reflecting layers formed respectively on the respective recording surfaces of the transparent substrate layers. An inclining angle formed between a pit inner wall and a normal line of each transparent substrate layer is set to be 20°–55°. Pit depth is set to be λ/3.5N–λ/2.7N (λ is the wave length of a laser beam for reproducing information recorded on the optical disc, N is the index of refraction of each transparent substrate layer).

In one aspect of the present invention, the wave length of the laser beam is 590–685 nm, the index of refraction of each transparent substrate layer is 1.45–1.65.

In another aspect of the present invention, a pit width measured at depth/2 of a pit is 0.25–0.35 μm, a shortest pit has a length of 0.40–0.44 μm, a longest pit has a length of 1.87–2.05 μm, a track pitch has a width of 0.7–0.8 μm.

According to a further aspect of the present invention, in a shortest pit the inclining angle is set to be 35°–55°, in a longest pit the inclining angle is set to be 20°–40°.

The above objects and features of the present invention will become more understood from the following description with reference to the accompanying drawings.

DETAILED DESCRIPTION OF THE PREFERRED EMBODIMENTS

Figure 1:
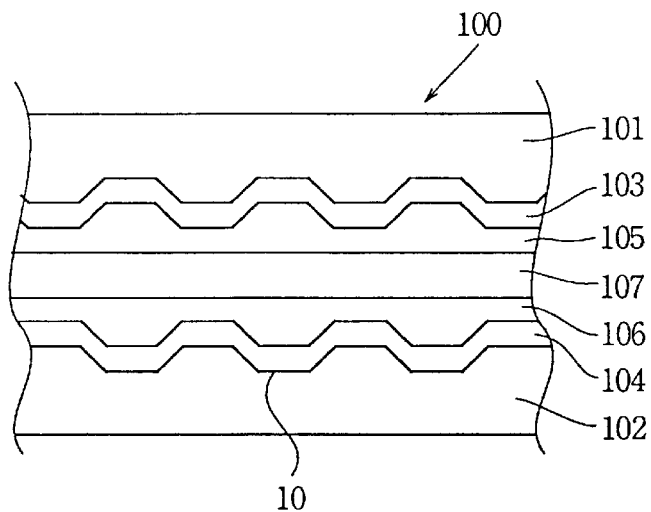
FIG. 1 is a cross sectional view indicating the structure of an optical disc according to the present invention.

Referring to FIG. 1, an optical disc 100 of the present invention comprises two transparent substrate layers 101 and 102, two reflecting layers 103 and 104, two protection layers 105 and 106, an adhesive layer 107.

The transparent substrate layers 101 and 102 are each made of a translucent resin such as polycarbonate resin or acrylic resin, each having a recording surface on which information has been recorded by virtue of numerous pits arranged concentrically or spirally.

The reflecting layers 103 and 104 are respectively formed on the respective recording surfaces of the transparent substrate layers 101 and 102, by sputterring or vacuum depositing a metal material such as aluminum or aluminum alloy on these recording surfaces.

The protection layers 105 and 106 are respectively formed on the respective outer surfaces of the reflecting layers 103 or 104, by spin coating or screen printing said surfaces with an ultraviolet ray setting resin.

Each of the transparent substrate layers 101 and 102 has a thickness of 0.6±0.03 mm, and their index of refraction is 1.45–1.65.

As shown in FIG. 1, the optical disc 100 is formed by adhesively bonding together two groups of transparent substrate layers (101, 102), reflecting layers (103, 104), protection layers (105, 106), with the use of an adhesive agent which is an ultraviolet ray setting material and forms the adhesive layer 107 having a thickness of 10 μm.

Figure 2:
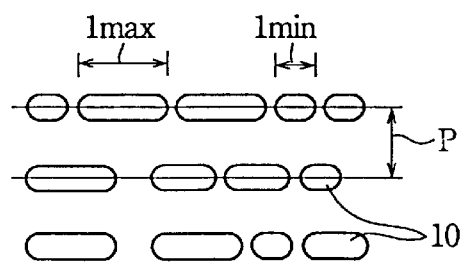
FIG. 2 is an explanatory view indicating an arrangement of information pits formed on the optical disc according to the present invention.

Referring to FIG. 2 indicating an arrangement of information pits formed on the optical disc according to the present invention, numerous information pits 10 are arranged in track direction on the recording surface of each transparent substrate layers (101, 102). The track pitch P has a width of 0.7–0.8 μm, a shortest pit has a length of 0.40–0.44 μm, a longest pit has a length of 1.87–2.05 μm.

Figure 3:
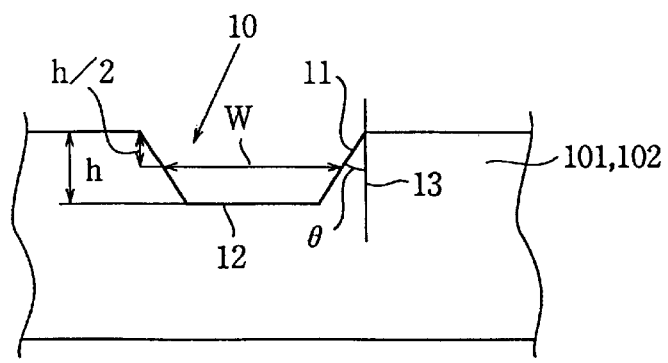
FIG. 3 is a cross sectional view indicating the structure of the above optical disc arranged in its radial direction.

Referring to FIG. 3 indicating the structure of the above optical disc arranged in its radial direction, each information pit 10 has a generally trapezoidal cross section. Two inner walls 11 of the pit 10 are facing each other and inclined in a manner such that top portion of the pit has a width larger than that of its bottom portion. The pit 10 has a bottom 12 which is almost flat. In FIG. 3, h denotes a depth of the pit 10, W denotes a width of the pit 10 measured at a depth of h/2, θ denotes an inclining angle formed between an inner wall 11 and a normal line 13 of each transparent substrate layers (101, 102).

In practice, W is set to be 0.25–0.35 μm, θ is set to be 20°–55°. However, in a pit having the shortest length, θ is set to be 35°–55°. On the other hand, in a pit having the longest length, θ is set to be 20°–40°.

Figure 4:
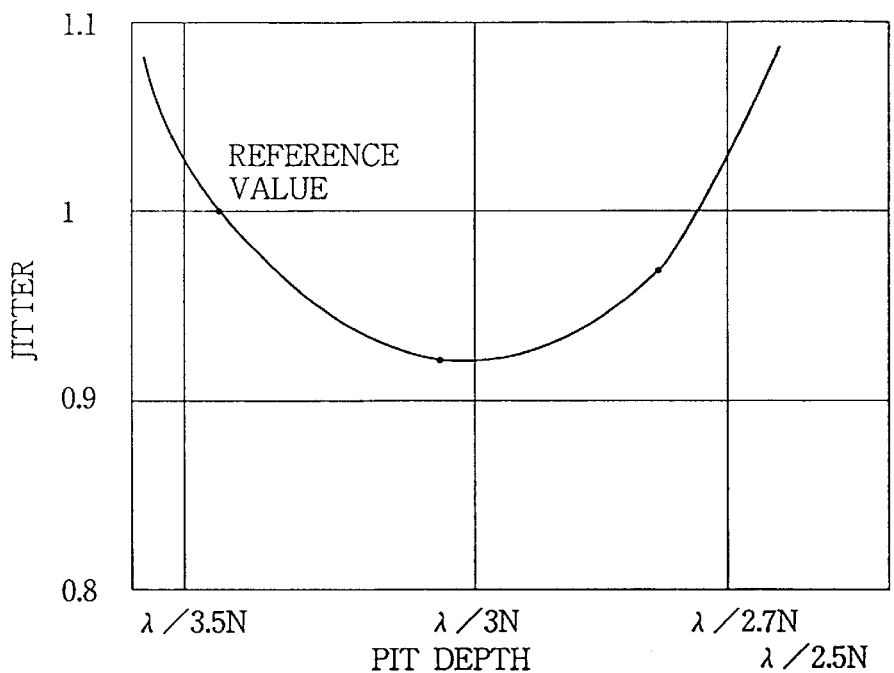
FIG. 4a is a graph indicating a characteristic of the optical disc according to the present invention.
FIG. 4b is another graph indicating another characteristic of the optical disc according to the present invention.
Figure 4:
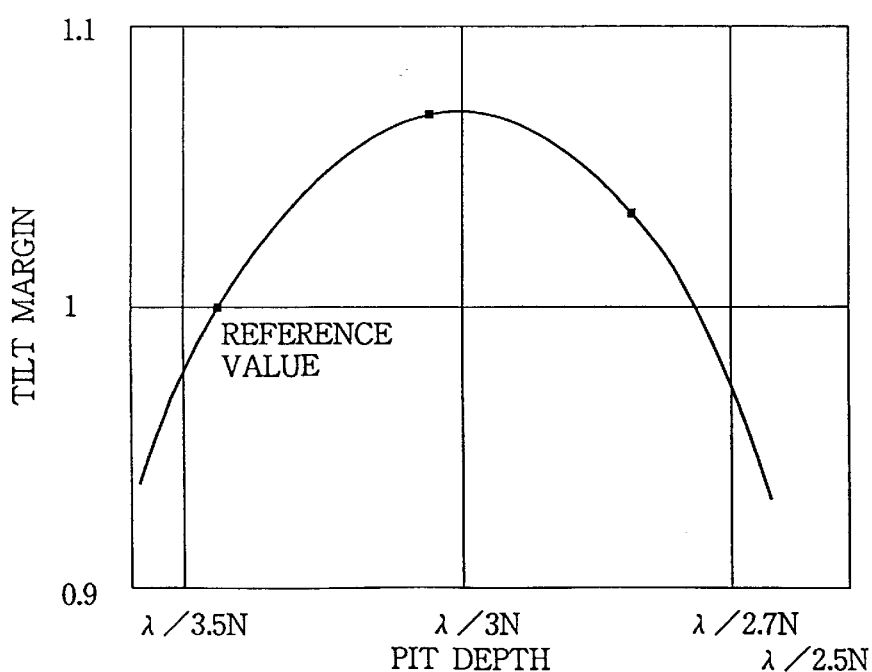

Referring to FIGS. 4a and 4b, in reproducing the optical disc 100 having the above-described structure, if we employ an information reproducing apparatus capable of producing a laser beam having a wave length of 590–685 nm and equipped with an objective lens having a numerical aperture of 0.55–065, it is able to obtain a relationship between a pit depth and a jitter (fluctuation) shown in FIG. 4a, and another relationship between a pit depth and a tilt margin shown in FIG. 4b.

It is understood from FIGS. 4a and 4b that, when pit depth is $\lambda/3N$ ($\lambda$ is the wave length of a laser beam for reproducing information recorded on the optical disc, N is the index of refraction of each transparent substrate layer), the jitter (fluctuation) becomes minimum whilst the tilt margin becomes maximum. Thus, it may be determined that a suitable range for the pit depth is $\lambda/3.5N$–$\lambda/2.7N$.

Figure 5:
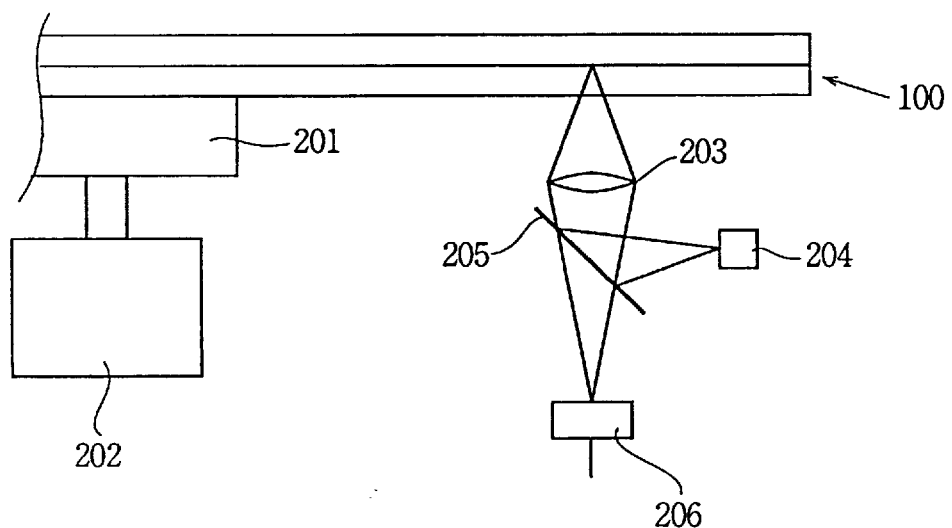
FIG. 5 is a schematic view indicating an optical disc reproducing system for reproducing the optical disc according to the present invention.

FIG. 5 shows a reproducing apparatus for reproducing the above optical disc 100 having the above-described structure. As shown in FIG. 5, the optical disc 100 is mounted on a turn table 201 so as to be driven by a spindle motor 202. An objective lens 203, which has an numerical aperture of 0.55–0.65, is properly positioned with respect to the optical disc 100. The objective lens 203 is movable in a focusing direction by means of a focusing coil (not shown) and in a tracking direction by means of a tracking coil (not shown).

Referring again to FIG. 5, a laser diode 204 produces a laser beam having a wave length of 590 nm–685 nm. Such a laser beam is reflected at a beam splitter 205, so that the laser beam may pass through the objective lens 203. In this way, the laser beam is converged through the objective lens 203, and a converged beam is enabled to irradiate a recording surface of the optical disc 100 through a transparent substrate layer thereof.

A reflected laser beam from the optical disc 100 is then passed through the objective lens 203 and the beam splitter 205 so as to be detected by a photo detector 206. In accordance with output signals from the photo detector 206, a focusing error signal, tracking error signal and reproduced information signal may be produced therefrom. The reproduced information signal will then be supplied to a signal process circuit (not shown) so as to perform predetermined demodulation.

It is understood from the above description that, by properly setting an inclining angle formed between a pit inner wall and a normal line of a transparent substrate layer, an optical disc thus produced not only has a desired modulation degree, but also has a desired characteristic such as a reduced jitter.

While the presently preferred embodiment of the this invention have been shown and described above, it is to be understood that these disclosures are for the purpose of illustration and that various changes and modifications may be made without departing from the scope of the invention as set forth in the appended claims.

What is claimed is:

1. An optical disc comprising:

two transparent substrate layers each having a recording surface with a plurality of pits arranged concentrically or spirally, said plurality of pits representing information stored on the recording surface, each transparent substrate layer having a thickness of 0.6±0.03 mm;

a reflecting layer formed on each of the recording surfaces of the two transparent substrate layers;

wherein an inclining angle formed between a pit inner wall and a normal line of each transparent substrate layer is 20°–55°, pit depth is set to be $\lambda/3.5N$–$\lambda/2.7N$, where $\lambda$ is the wave length of a laser beam incident the optical disc for reading the information recorded on the optical disc, and N is the index of refraction of each transparent substrate layer.

2. An optical disc according to claim 1, wherein a wave length of the laser beam is 590–685 nm, and an index of refraction of each of the two transparent substrate layers is 1.45–1.65.

3. An optical disc according to claim 1, wherein a pit width measured at ½ of a depth of one pit of the plurality of pits is 0.25–0.35 μm, a shortest pit of the plurality of pits has a length of 0.40–0.44 μm, a longest pit of the plurality of pits has a length of 1.87–2.05 μm, a track pitch has a width of 0.7–0.8 μm.

4. An optical disc according to claim 1, wherein in a shortest pit of the plurality of pits the inclining angle is 35°–55°, in a longest pit of the plurality of pits the inclining angle is 20°–40°.

\* \* \* \* \*